May 22, 1928.
F. E. HAND
DISK HARROW
Filed July 5, 1924
1,670,407
3 Sheets-Sheet 1
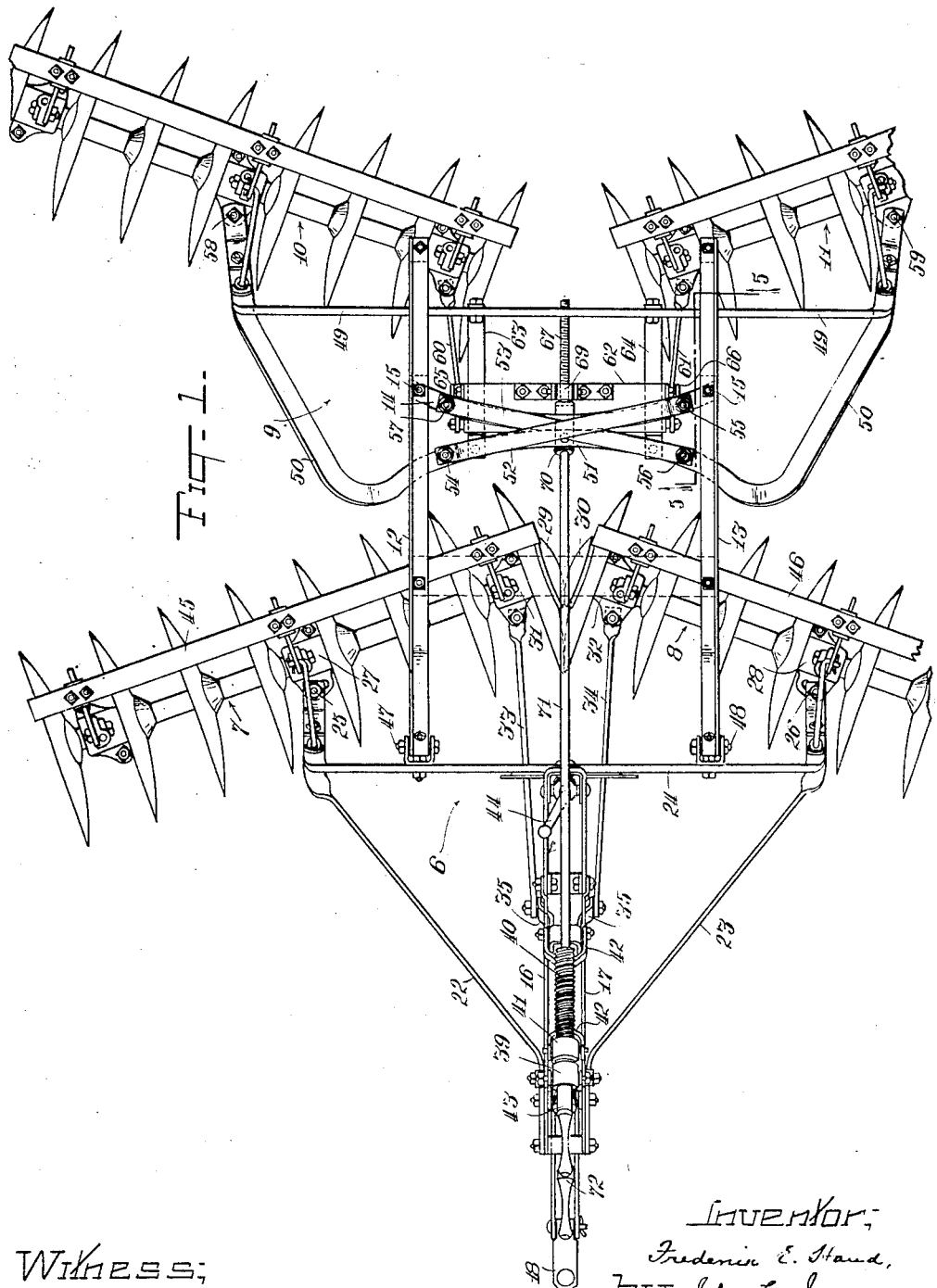

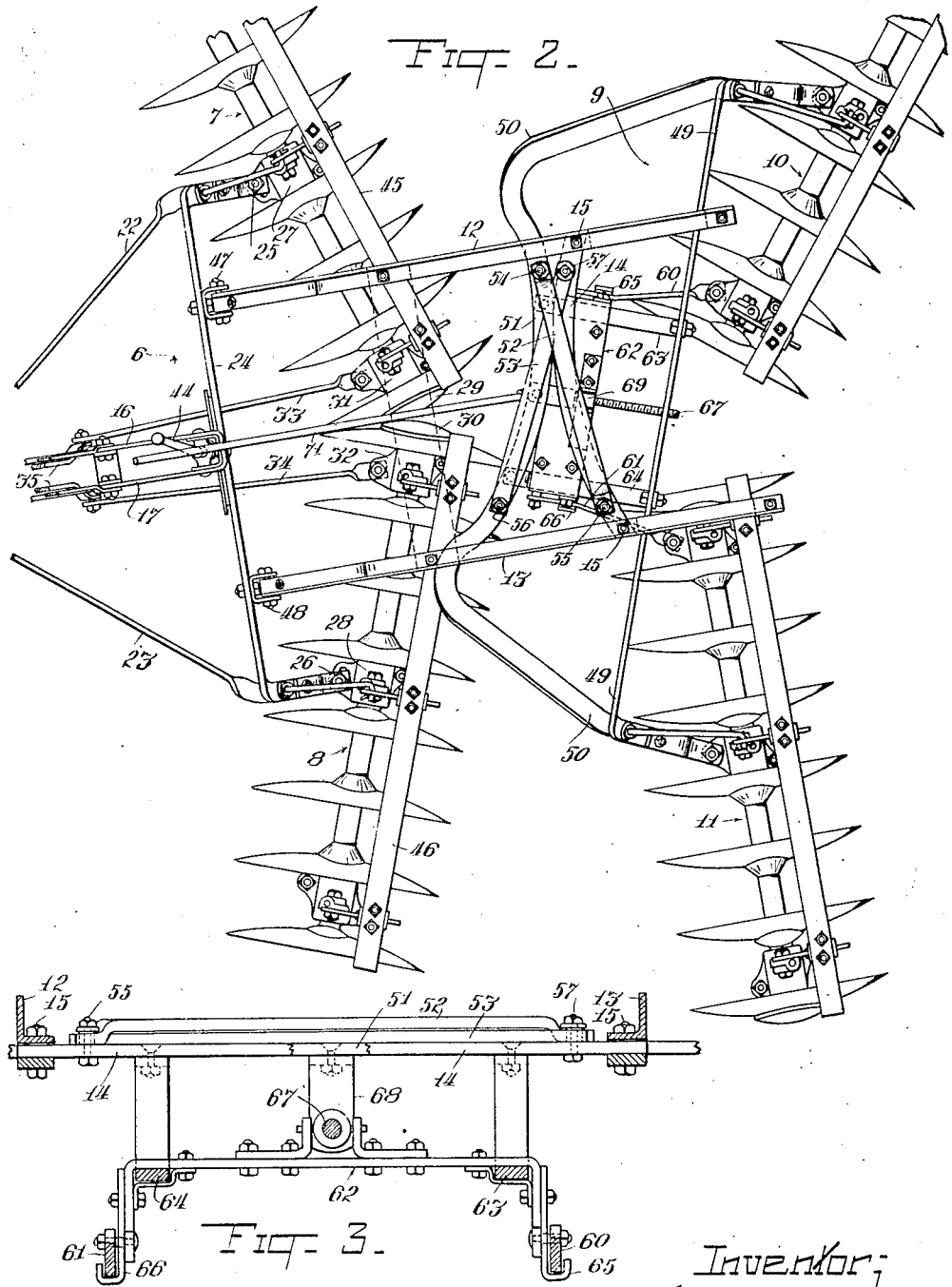

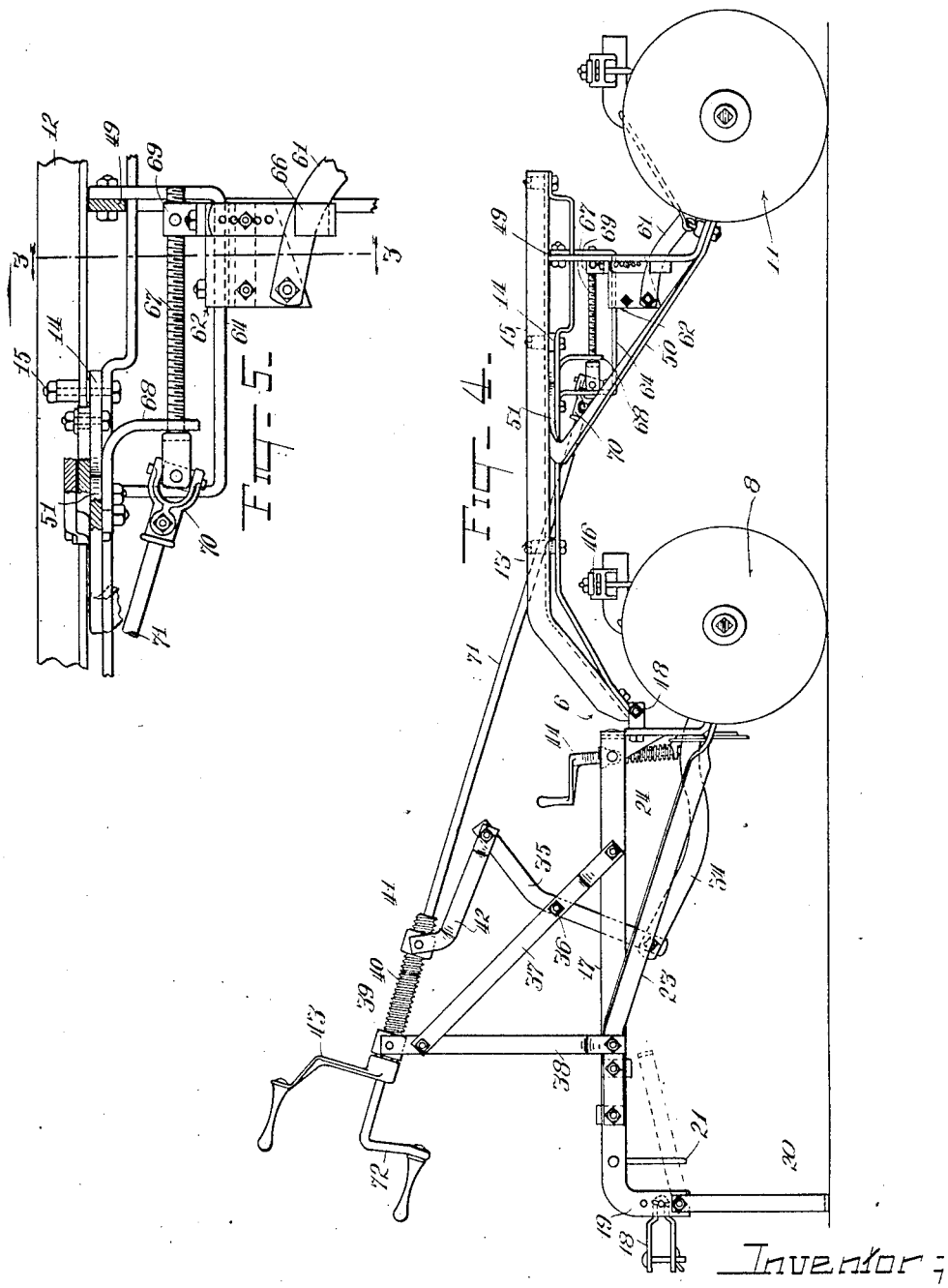

Patented May 22, 1928.

1,670,407

UNITED STATES PATENT OFFICE.

FREDERICK E. HAND, OF SYRACUSE, NEW YORK, ASSIGNOR TO DEERE & COMPANY, OF MOLINE, ILLINOIS, A CORPORATION OF ILLINOIS.

DISK HARROW.

Application filed July 5, 1924. Serial No. 724,505.

My invention relates to tandem disk harrows, or disk harrows comprising front and rear sections or units each composed of a pair of disk gangs so mounted that they may be turned into a position of alinement for transport purposes, which is their inoperative position, or may be turned into angular relation to each other, which is their operative position.

In harrows of the tandem type the rear section is drawn through the front section, with which the draft power, either a team or a tractor, is connected, and it has been largely the custom to connect the rear section flexibly with the front section so as to permit the front and rear units or sections to swing laterally relatively to each other for convenience in driving around trees or other obstacles, or in turning corners, as well as to permit vertical movement of either or both of the rear gangs relatively to the gangs of the front section, but a serious objection to flexibly connected tandem disk harrows as heretofore constructed is that they have not been equipped with adequate means for so controlling the position of the rear harrow section that each of the disks of the rear gangs will always work in the ridge left between the furrows turned by the pair of front disks behind which it is set, or, in other words, will not run into or across one of such furrows and thereby leave some portion of the ridge between them unturned. This relation of the disks of the rear gangs to those of the front gangs may appropriately be termed "registration", and the maintenance of registration in a disk harrow of the tandem flexibly connected type on straight-away work, and also when turns are made, so that the ridges left between the front disks will be properly cut at all times, and, in making turns, the rear gangs cannot by swinging in on the turn damage trees or strike obstacles that have been avoided by the front gangs, is a result which those skilled in the art have for many years sought to accomplish, but which prior to my present invention has never been realized in a practical way. Various expedients have been proposed for flexibly connecting together the front and rear harrow sections in such manner as to permit the disks of the rear section normally to maintain a position of registration on curves, such, for example, as the use of a pair of crossed links connected at their forward ends with the front section and at their rear ends with the rear section, in the same manner as such links are used in the running gear of vehicles to cause the rear wheels of the vehicle in rounding a curve to describe arcs concentric with those described by the front wheels, as will be more explicitly hereinafter pointed out, but all prior constructions of which I am aware have proved inoperative or unsuccessful for the intended purpose, because they have not been so designed as to use the power of the draft advantageously as a positive factor in maintaining registration under the varying operating conditions encountered in the operation of disk harrows. In the operation of flexibly connected tandem disk harrows the front section is steered, and held against any considerable oscillation about a vertical axis, by the draft power, but the rear section, being pivotally connected to the front section, in the absence of adequate controlling means is free to oscillate or swing laterally about a vertical axis independently of the front section whenever the resistance encountered by the two rear gangs becomes unequal, which swinging shifts the disks from their normal registering position with relation to the disks of the front gangs. The condition of an unopposed tendency of the rear harrow section to so swing laterally, which may be termed "nervousness", is highly objectionable, as in order to properly perform their work the disks of the rear section should be held steady and maintain their registering position, and this is particularly desirable in turning, and also in side hill work, where a nervous harrow has a strong tendency to side-slip or "drift," and so get out of registration. Many constructions have heretofore been proposed to cure this nervousness and obtain stability, but while some of such attempts have been measurably successful so far as relieving nervousness on straight-away work is concerned, it has been done at the expense of flexibility, and of maintaining registration on curves, or on turns to avoid obstacles.

The object of my present invention is to provide a flexible tandem disk harrow in which the draft force will operate as a positive factor in maintaining registration and overcoming nervousness by opposing oscillation or lateral swinging of the rear harrow section independently of the front section, and by directly aiding in the restoration of the rear section to its normal operative position when a straight-away course is resumed after a turning movement. This object I accomplish preferably as illustrated in the drawings and as hereinafter described. What I regard as new is set forth in the claims.

In the accompanying drawings, in which I have illustrated one of the various ways in which a disk harrow embodying my invention may be constructed.—

Fig. 1 is a plan view of the principal parts of a tandem disk harrow, some parts being broken away, and the front and rear sections being shown in their normal operative position, i. e., the position they occupy for straight-away work;

Fig. 2 is a similar view showing the parts when the harrow is being turned to the left;

Fig. 3 is a vertical cross-section on line 3—3 of Fig. 5 looking to the rear;

Fig. 4 is a side elevation of the harrow with the gangs in transport position; and Fig. 5 is a partial longitudinal vertical section on line 5—5 of Fig. 1.

It will be understood that, aside from my improvements, the harrow shown in the drawings is merely illustrative of a class of harrows commercially well known, and I wish it to be understood that the improvements hereinafter described may be applied to any other tandem disk harrow to which they are adapted.

Referring to the drawings,—the harrow therein illustrated comprises a front or draft frame designated as a whole by the reference numeral 6, a front harrow section composed of a pair of gangs 7, 8 of any approved type, a rear frame designated as a whole by the reference numeral 9, a rear harrow section composed of a pair of gangs 10, 11, and a draft connection through which the rear harrow section is operatively connected with the front frame so as to be drawn thereby, composed principally of a pair of parallel draft bars 12, 13 connected with the front frame and cross-connected toward their rear ends by a curved bar 14, the ends of which are firmly secured to the draft bars 12, 13, as by bolts 15 shown in Fig. 1. Preferably the bars 12, 13 are braced together and held in proper relation to each other by a cross brace at the point indicated by dotted lines in Figs. 1 and 2. So far as may be necessary to a clear understanding of my invention, the parts above referred to will be more specifically hereinafter described.

The front frame 6 preferably comprises two longitudinally disposed bars 16, 17 spaced apart and suitably braced together, and having at their forward ends a clevis 18 or other suitable means for connecting the harrow to a tractor, or to a team, as may be preferred. In the arrangement shown in the drawings, and particularly in Fig. 4, the forward ends of the bars 16, 17 are bent downward, as shown at 19, and the clevis 18 is secured to this downturned portion, which also has hinged to it a support 20 which may be turned down to the position shown in full lines in Fig. 4 to support the forward end of the front frame, or may be swung back to the position shown in dotted lines in said figure, when it may be held up by a hook 21. Secured to the forward portions of the bars 16, 17 are diagonal braces 22, 23, the rear ends of which are connected with a transverse frame member in the form of a beam 24, which is also secured to the rear end portions of the bars 16, 17. The end portions of the beam 24 are bent downward and backward, and are adjustably connected by vertically disposed bolts 25, 26 with bearing brackets 27, 28 carried by the gangs 7, 8 respectively. The bolts 25, 26 serve as vertical pivots about which the gangs 7, 8 respectively swing when they are adjusted to vary their angular relation to each other. At their inner ends the gangs 7, 8 are provided with the usual end thrust members in the form of convex bearing surfaces 29, 30 which bear against each other, as shown in Fig. 1, and adjacent to their inner ends said gangs are provided with brackets 31, 32 connected respectively by links 33, 34 with a vertically disposed lever 35, by the rocking of which the inner ends of the gangs may be moved forward or backward. The lever 35, which is bifurcated, as shown in Fig. 2, is fulcrumed between its ends on bolts 36 supported by braces 37, the lower ends of which are secured to the bars 16, 17, respectively, while their upper ends are secured to standards 38, as shown in Fig. 4. Pivotally mounted between the upper ends of the standards 38 is a collar 39 through which extends a screw-threaded shaft 40 adapted to rotate therein but held thereby against endwise movement. On said shaft is mounted an internally threaded collar 41 which is pivotally connected by links 42 with the upper ends of the members of the lever 35. A crank 43 on the shaft 40 provides means for rotating it, so that by rotating said shaft the collar 41 may be moved along it, thereby actuating the lever 35 and angularly adjusting the front gangs. The shaft 40 and collar 41 also serve to lock the gangs in their different positions of adjustment. The inner ends of the front gangs may be vertically adjusted to regulate their penetration by means of a crank 44, shown in Fig. 4, in a manner well known to those familiar with the art. The front gangs are provided with the usual horizontal scraper-carrying bars 45, 46, best shown in Figs. 1 and 2. It will be understood that the manner of mounting, and the devices for adjusting, the front gangs have been described merely that the construction illustrated may be fully understood. My invention, however, is not concerned with these specific devices, as the gangs may be mounted in any of the numerous approved ways exemplified in commercial harrows of the tandem type.

The rear harrow section is flexibly connected with the front harrow section so as to be capable of swinging laterally or approximately about a vertical axis, as well as of swinging vertically, and also so as to permit the rear frame to rock to some extent about an axis extending longitudinally of the harrow so that the opposite rear gangs may accommodate themselves to inequalities in the ground as is usual in harrows of this type. In the illustrated construction these several movements are provided for by means which will now be described. By reference to Figs. 1 and 2 it will be seen that the draft bars 12, 13 are pivotally connected at their forward ends with the transverse beam 24 by horizontal bolts 47, 48, and consequently may swing vertically. Said bars 12, 13, which are preferably made of angle iron are placed equally distant from and at opposite sides of the median line of the front harrow section, and are held in parallelism with such median line by the curved bar 14, which is symmetrically disposed relatively to said bars with its convex surface toward the front, and is fixedly secured thereto at its ends by the bolts 15. The bars 12, 13, together with the curved bar 14, constitute a supplemental draft frame which is capable of swinging vertically about the pivot bolts 47, 48, and, as will hereinafter appear, the curved bar 14 functions as a rocker bearing through which the draft applied to the front frame is transmitted to the rear frame 9 and through it to the gangs 10, 11 of the rear harrow section. The pivotal connections at the front ends of the bars 12, 13 may be made loose enough to permit either of the rear gangs to rise or fall to some extent independently of the other, so that said gangs may accommodate themselves to inequalities in the ground, or the flexibility of the draft frame may be relied on to permit such movement.

The frame of the rear harrow section comprises a transverse beam 49 which is similar to the beam 24, and is similarly connected to the rear gangs, as will be hereinafter described, and also a bar 50, the end portions of which are connected with the end portions of the beam 49. From the points of its connection with the beam 49 the bar 50 preferably extends diagonally forward and inward at both sides to a curved central portion or member 51, which is preferably an integral part of said bar and extends horizontally across the bars 12, 13 in front of the curved bar 14. The rearward surface of the member 51 is made convex, its curvature being the same as that of the front surface of the bar 14 against which it is adapted to bear, so that the members 14 and 51 cooperate with each other to form a rocking draft connection between the front and rear frames, and therefore between the draft transmitting devices and the rear harrow section, through which draft force is transmitted to the rear section by a pushing operation. The arrangement is such that when the front and rear harrow sections are in position for straight-away work, at which time the beams 24 and 49 will be parallel with each other, the centers of the convex surfaces of the bar 14 and the member 51 will be in contact with each other, and this point of contact will lie in the normal median line of the harrow, which is a central line perpendicular to the transverse axes of the two units when they are in a position of parallelism. When, however, the harrow sections are swung to an angular position relatively to each other, as in turning the harrow in one direction or the other from a straight-ahead position, the curved bar 14 will swing in the same direction as the front harrow section, and by rocking on the member 51 will cause the point of contact between the convex surfaces of said members to travel toward the side of the harrow opposite that toward which the front section is turned, or, in other words, toward the outside of the curve through which the harrow is being turned. For example, if the harrow be turned to the left, as illustrated in Fig. 2, the front and rear harrow sections will assume a position similar to that illustrated in said figure, and the point of contact between the members 14 and 51 will travel to the right a greater or less distance, depending on the degree of curvature of said members and the sharpness of the turn that is being negotiated by the harrow. When the harrow is turned the transverse axes of the harrow sections, if projected, would intersect at some point adjacent to the center of the curve through which the harrow is being turned, and such point of intersection would move closer to the harrow, or toward the outside of such curve, with any increase in the sharpness of the turn. In the example cited this would be toward the right, or in the same direction as that in which the point of contact between the members 14 and 51 travels. A similar shifting of the point of contact of the members 14 and 51 occurs whenever for any reason there is any lateral or angular movement of the harrow sections relatively to each other. As in making a turn, as well as when the rear section swings laterally, the center of load represented by the rear harrow section shifts toward the outside of the curve, or in a direction opposite that in which said section swings, it will be apparent that by the arrangement described under either of such conditions the point of application of the draft to the rear harrow section, or in other words, the line of draft between the front and rear sections shifts in the same direction as the center of load, and consequently the draft operates effectively to restore the rear harrow section to its normal or straight-away position. As soon as the latter position is reached, the contacting point of the members 14 and 51 is again brought into coincidence with the median line of the harrow and the line of draft coincides with the center of load. Any deviation of the front and rear harrow sections from their normal position, therefore, brings the force of the draft into play toward restoring the sections to their normal position, and accordingly the draft force is always effective as a stabilizing factor and resists any tendency of the rear harrow section to swing laterally, or to side slip or drift on side hill work. In this connection it should also be noted that when the front harrow section is turned from a straight-away position, the action of the members 14 and 51 causes the center of mass of the rear harrow section to be moved up closer to the front harrow section. This relative forward movement of the rear section of course requires the expenditure of draft force, owing to the resistance of the rear gangs, which gives them a tendency to lag, and consequently whenever the harrow is turned laterally in either direction the resistance of the rear harrow section tends to restore both sections to their straight-away position, and incidentally to swing the members 14 and 51 so as to bring their point of contact to the median line of the harrow, at which time the front and rear sections are farthest apart. It will thus be seen that the force of the draft, together with the ground resistance of the rear harrow section, cooperate to restore the harrow sections to their normal position whenever there is any deviation from such position. The harrow is therefore essentially stable, or not nervous. The degree of curvature of the members 14 and 51 may vary within rather wide limits, but I prefer to use comparatively flat curves because of the greater degree of stability thereby realized.

Registration of the disks of the front and rear sections combined with the stabilizing characteristics above described is best obtained by making the curved contacting surfaces of the members 14 and 51 similar arcs of an ellipse, and locating said members so that the point of contact of such surfaces is always equi-distant from the transverse axes of the front and rear harrow sections, and coincides with the median line of the harrow when the harrow sections are in their normal position. By the transverse axis of a harrow section is meant a horizontal line perpendicular to the median line of such section and intersecting the longitudinal centers of the two gangs constituting such section. Obviously when the harrow sections are in their normal position, for straight-away work, their transverse axes are parallel, and to secure registration the front and rear sections should be so connected that whenever they deviate from a straight-away or parallel position, as in rounding curves or turning corners, both sections swing through the arc of a circle the axis or center of which is determined by the point of intersection of their respective transverse axes projected, and the radius of which may be measured along either of said transverse axes from such center to the center of the median line of either harrow section. By making the curved surfaces of the members 14 and 51 similar arcs of an ellipse, and locating said members so that their point of contact when the harrow sections are in their normal position is midway between the front and rear transverse axes of said sections, such midway position will not be affected by lateral shifting of their point of contact incident to turning or lateral swinging of the harrow sections, as such point of contact will move along a line substantially bisecting the angle of convergence of said sections. The movement of said sections requisite to maintain registration will therefore be brought about, and, at the same time, as such movement of the point of contact is in a direction away from that side of the harrow toward which the transverse axes of the sections converge, when the sections are moved from a position of parallelism, or in the opposite direction when they are moved toward a position of parallelism, the line of the draft applied to the rear section is shifted in the proper direction to maintain stability, as hereinbefore described. I wish it to be understood, however, that although the best results as to maintaining registration are obtained by the equi-distant positioning of the point of contact as above described, considerable variation is permissible where a high degree of accuracy is not required, and therefore my invention is not limited to mathematical exactness in that respect. From the foregoing it will be manifest that the members 14 and 51 constitute controlling means which functions to pivotally connect the front and rear harrow sections together so that the rear section is drawn through the front section and, while angling of said sections is permitted, they are held relatively to each other so that the disks of corresponding front and rear gangs always maintain registration whether the harrow be moving straight ahead or be making a turn, or the rear section otherwise be caused to swing laterally relatively to the front section, and that said controlling means also functions to cause the point of application of the draft to the rear section to move laterally relatively to the line of advance when the rear section swings laterally, or when the harrow sections are angled relatively to each other in making a turn, such lateral movement of the point of application of the draft being in a direction inverse to that of the turn, so that the draft acts directly to restore the sections to parallel relation to each other, as well as to resist angling of the harrow sections when they are parallel.

In order more effectively to hold the members 14 and 51 in proper working relation to each other under ordinary operating conditions, and also to hold said members in operative contact with each other when backing the harrow, said frames, in the construction illustrated, are pivotally connected together by crossed links 52, 53 of equal length, best shown in Figs. 1 and 2. As therein shown, the forward end of the link 52 is connected by a pivot 54 with the member 51 at one side of the median line of the harrow, and its rear end is connected by a pivot 55 with the opposite end portion of the member 14 and preferably at an equal distance from the median line of the harrow. In like manner the forward end of the link 53 is connected with the opposite end portion of the member 51 at a point equi-distant with the pivot 54 from the median line by a pivot 56, while its rear end is connected with the member 14 at the opposite side of the harrow by a pivot 57 located similarly to the pivot 55. Preferably said links are arranged to cross each other at their longitudinal centers when the front and rear sections of the harrow are in parallel relation to each other, and the front and rear pivots of said links are then equi-distant from the median line, but in any event the center of the crossing point of the links 52, 53 should always coincide with the point of contact between the members 14 and 51. As above explained, when the harrow is in straight-away position, such point is in the median line of the harrow, but when the front harrow section is turned in one direction or the other it is shifted in the opposite direction, and where such links are used it is essential that the curvature of the engaging surfaces of the members 14 and 51 be coordinated with the curve generated by the travel of the crossing point of the links 52, 53 incident to change in the angular relation between the front and rear harrow sections, so that said points will always coincide. In the construction illustrated this curve is the arc of an ellipse, the major axis of which corresponds with the effective length of the links 52, 53, and the distance between the foci of which is equal to the distance between the front (or the rear) pivots of said links.

While in the construction shown the crossed links 52, 53 having their rear ends connected with the front frame and their front ends with the rear frame are employed for the purpose of holding the front and rear frame members in proper relation to each other when backing as well as when the harrow is moving forward, they may also be employed in lieu of the members 14 and 51 to secure stability and maintain registration in the manner above described. This will be apparent if it be assumed, for example, that the members 14 and 51 were shaped so that they did not bear against each other. In that case the force of the draft would be applied directly to the rear ends of the links 52, 53, and would be transmitted through them to the rear frame member 50, so that the draft force would operate through said links to push the rear harrow section, just as the member 14 operates through the member 51 to push the latter section. Turning of the harrow, or lateral swinging of the rear section would accordingly shift the crossing point of said links in the opposite direction to that in which the turn or swing is made, or toward the outside of the curve, in the same way and with the same result as in the case of the lateral shifting of the point of contact between the members 14 and 51 above described. In this respect the crossed links above described function entirely differently from the way in which they would function if the draft were connected with the forward instead of with the rear ends of said links, and produce radically different results so far as maintaining stability and registration is concerned. It has heretofore been proposed to use crossed links having their forward ends connected to draft devices, and their rear ends to a trailing member, for the purpose of promoting registration by permitting the trailing member normally, or in the absence of adverse influences, to follow in the same curve as the member that it trails, but in all of such prior constructions the trailing member is exceedingly nervous and easily gets out of registration because the crossed links do not operate to shift the point of application of the draft to the rear member in the proper direction to maintain the stability of the trailing member or members, or, in other words, to cure nervousness,—on the contrary their operation is quite the opposite, since in these constructions the point of application of the draft to the trailing element shifts in the same direction as that in which such element swings or the front element is turned, i. e., toward the inside of the curve, and consequently the draft force applied to the trailing element tends to move it further away from, and to resist its return to, its normal straight-away relation to the front element, instead of to restore the trailing element to and maintain it in such position, as is the case with my improved construction. It will be seen, therefore, that the difference between pulling and pushing through the crossed links, or through the curved members 14 and 51, is a vital one, and produces opposite results as regards maintaining registration and overcoming nervousness.

In the construction illustrated the crossed links are used primarily to hold the curved members 14 and 51 against independent endwise movement relatively to each other, and to prevent their separation in backing, and, except when backing, are not intended to transmit the draft to the rear unit, as that is done by the members 14 and 51. Nevertheless, it is manifest that in the absence of such curved members, the crossed links having their rear ends connected with the front unit or draft and their front ends with the rear unit or trailing member, may be employed as means equivalent to said curved members to transmit the draft in the same way to the rear unit. The use of such crossed links as the draft transmitting devices, while within the scope of the generic claims hereinafter made, is however not specifically claimed herein as that construction constitutes the subject matter of a separate application for Letters Patent of even date herewith. The curved members may of course be employed in connection with other forms of devices adapted to hold them in operative relation to each other, such, for example, as that shown in the application of Charles H. White, Serial No. 724,530, filed of even date herewith.

As has been suggested, the degree of curvature of the members 14 and 51 may vary within rather wide limits, depending on the design of the harrow, and where very accurate registration is desired their curvature should be such as to cause the center of the transverse axis of the rear harrow section to swing substantially in the same arc as the center of the transverse axis of the front harrow section, which may be accomplished by making said members similiar arcs of an ellipse. My invention, however, is not limited to making the curvature of the members 14 and 51 elliptical, when such members are used, as either or both may be shaped in any other way suitable for the purpose described.

In the harrow illustrated the rear gangs 10, 11 are mounted so as to be angularly adjustable in the same manner as the front gangs, and while such adjustment has nothing to do with the novel features which form the subject matter of this application, it may be explained that the gang 10 is mounted to swing about a vertical pivot 58, and the gang 11 is mounted to swing about a similar pivot 59, said pivots being mounted in the end portions of the rear frame members 49, 50. Angular adjustment of such gangs is effected by means of bars 60, 61 pivotally connected with the inner end portions of said gangs respectively, and also connected with the end portions of a transverse frame 62 arranged to slide longitudinally on bars 63, 64 secured to the members 49, 50 of the rear frame, as shown in Figs. 1, 4 and 5. Preferably the bars 60, 61 extend over stirups 65, 66 secured to the frame 62, as shown in Fig. 3. The frame 62 is movable fore and aft to correspondingly move the inner ends of the gangs 10, 11 by means of a screw-threaded shaft 67, held against longitudinal movement by a plate 68, shown in Fig. 5, and working in a threaded sleeve 69 carried by the frame 62. The forward end of the shaft 67 is connected by a universal coupling 70 with a rod 71 that extends forward, and preferably through the screw-threaded shaft 40 in which it turns freely and is movable longitudinally to compensate for the fore and aft movement of the rear section relatively to the front section incident to turning movements of the harrow, as hereinbefore described, the foward end of said rod 71 being provided with a crank 72 by which it may be rotated. The shaft 67 serves not only to adjust the angular position of the rear gangs, but also holds them in position when adjusted, any other suitable means may, however, be employed for adjusting the several gangs angularly, as my invention contemplates the application of the improvements hereinbefore described by which registration and stability are obtained to any of the various forms of tandem disk harrows comprising front and rear sections flexibly coupled together, regardless of differences in design of such harrows in other respects.

So far as I am aware, heretofore, no one has proposed to utilize the force of the draft to oppose angling of the rear unit with respect to the front unit of a flexibly coupled tandem disk harrow, by shifting the point of application of the draft to the rear unit laterally away from the median line of such unit in the same direction as that in which the center of load shifts incident to such angling movement, and to an extent that may be said to be commensurate with, or proportional to, the angularity of the units, i. e.—the gradual increase in the distance of the point of application of the draft from the median line as the angularity increases, and vice versa, and my invention therefore includes this feature generically, whether the connections between the harrow units be such as to permit their transverse axes to swing through substantially concentric arcs or not, although the use of connections that will permit such movement of the units is necessary to realize in full measure the benefits of my invention.

What I claim as my invention and desire to secure by Letters Patent, is—

1. A tandem disk harrow having front and rear disk carrying units arranged to be angled relatively to each other, and connections between said units comprising means actuated by angling movement thereof in one direction to shift the line of draft between said units in the opposite direction.

2. A tandem disk harrow comprising front and rear disk-carrying units arranged to be angled relatively to each other, and draft connections between said units arranged to hold them constantly in substantial registering relation to each other, and actuated by angling movement of said units in one direction to shift the line of draft between said units in the opposite direction.

3. A tandem disk harrow comprising front and rear disk-carrying units, and draft devices coupling said units together to rock laterally relatively to each other about points substantially midway between their respective transverse axes and operating, when said units are swung angularly, to shift the rocking point laterally in a direction away from that side of the harrow toward which said transverse axes converge.

4. A tandem disk harrow having front and rear disk-carrying units arranged to be angled relatively to each other, and draft connections between said units comprising means actuated by movement of the transverse axes of said units toward or from a position of parallelism to shift the draft applied to the rear unit laterally in the same direction as that in which the point of intersection of said transverse axes, projected, moves.

5. A tandem disk harrow having front and rear disk-carrying units arranged to be angled relatively to each other, and draft connections between said units comprising means actuated by movement of the transverse axes of said units toward or from a position of parallelism to shift the point of application of the draft to the rear unit laterally in the same direction as that in which the point of intersection of said transverse axes, projected, moves, and to maintain the point of application of the draft substantially equi-distant from said transverse axes during the angling movement of said units.

6. A tandem disk harrow comprising front and rear disk-carrying units, and draft connections coupling said units together to permit angling movement thereof with respect to each other about points lying between the transverse axes of said units, and actuated by movement of said transverse axes toward or from a position of parallelism to shift the draft applied to the rear unit laterally in the same direction as that in which the point of intersection of said transverse axes, projected, moves.

7. A tandem disk harrow comprising front and rear disk-carrying units, and draft connections coupling said units together to permit angling movement thereof with respect to each other about points constantly equi-distant from the transverse axes of said units, and actuated by movement of said transverse axes toward or from a position of parallelism to shift the point of application of the draft to the rear unit laterally in the same direction as that in which the point of intersection of said transverse axes, projected, moves.

8. A tandem disk harrow comprising front and rear disk-carrying units, and draft connections coupling said units together to permit angling movement thereof with respect to each other about points constantly equi-distant from the transverse axes of said units, and actuated by movement of said transverse axes toward or from a position of parallelism to shift the point of application of the draft to the rear unit laterally in the same direction as that in which the point of intersection of said transverse axes, projected, moves.

9. A tandem disk harrow comprising a front disk-carrying section, a rear disk-carrying section, and means coupling said sections together to permit angling movement thereof with respect to each other about points constantly equi-distant from the transverse axes of said sections, said coupling means being arranged to transmit the draft to said rear section and to be actuated by angling movement thereof to shift the line of draft laterally with relation to the line of advance in a direction opposite to that in which said rear section moves.

10. A tandem disk harrow comprising a front harrow section, a rear harrow section, and means coupling said sections together to permit angling movement thereof relatively to each other and to maintain said sections substantially in registering relation to each other, said coupling means being arranged to transmit the draft to said rear section and, when the sections are angled, to shift the line of draft between said sections laterally with relation to the line of advance in a direction opposite to that in which said rear section swings.

11. A tandem disk harrow comprising a front harrow section, a rear harrow section, and means coupling said sections together to permit angling movement thereof relatively to each other and maintain the centers of the transverse axes of said sections, when they are angled relatively to each other, equi-distant from the point of intersection of said transverse axes projected, said coupling means being arranged to transmit the draft to said rear section and when the sections are angled, to shift the line of draft laterally with relation to the line of advance in a direction opposite to that in which said rear section swings.

12. A tandem disk harrow comprising front and rear disk-carrying units arranged to be angled relatively to each other, and means for pushingly applying draft force from the front unit to the rear unit, said means being arranged to be actuated by angling movement of said units relatively to each other to shift the point of application of the draft to said rear unit in a direction opposite to that in which said rear unit is angled.

13. A tandem disk harrow comprising front and rear disk-carrying units arranged to be angled relatively to each other, and draft connections between said units arranged to pushingly transmit the draft from said front unit to said rear unit and actuated by angling movement of said units in one direction to shift the line of draft between said units in the opposite direction.

14. A tandem disk harrow having front and rear disk-carrying units arranged to be angled relatively to each other, and draft connections between said units comprising means actuated by movement of the transverse axes of said units from a position of parallelism to move the central portion of the rear unit toward said front unit and to shift the line of draft between said units laterally in a direction away from that side of the harrow toward which said transverse axes converge.

15. A tandem disk harrow having front and rear disk-carrying units adapted to be angled relatively to each other, and draft connections between said units arranged to rock relatively to each other transversely of the harrow and to co-act to pushingly transmit draft force to the rear unit and shift the line of draft applied to the rear unit laterally in the same direction as that in which the point of intersection of the transverse axes of said units, projected, moves when said units are angled relatively to each other.

16. A tandem disk harrow having front and rear disk-carrying units adapted to be angled relatively to each other, and transversely disposed bearing members connected respectively with said units and having rocking engagement with each other, said members being arranged to co-act to pushingly transmit draft force from the front unit to the rear unit.

17. A tandem disk harrow having front and rear disk-carrying units adapted to be angled relatively to each other, transversely disposed rocker bearing members connected respectively with said units and arranged to co-act to pushingly transmit draft force from the front unit to the rear unit, and means for holding said bearing members in operative relation to each other.

18. A tandem disk harrow having front and rear disk-carrying units adapted to be angled relatively to each other, and front and rear coupling members between said units arranged to rock relatively to each other transversely of the harrow, the front member being carried by said rear unit and the rear member being carried by the front unit, said coupling members being arranged to shift the line of draft applied to the rear unit laterally in the same direction as that in which the point of intersection of the transverse axes of said units, projected, moves when said units are angled relatively to each other.

19. A tandem disk harrow having front and rear disk carrying units adapted to be angled relatively to each other, and front and rear coupling members between said units arranged to rock relatively to each other transversely of the harrow and to hold said units in registering relation to each other, the front coupling member being carried by said rear unit and the rear coupling member being carried by the front unit, said coupling members being arranged to shift the line of draft applied to the rear unit laterally in the same direction as that in which the point of intersection of the transverse axes of said units, projected, moves when said units are angled relatively to each other.

20. A tandem disk harrow comprising a front disk-carrying unit, a rearwardly extending frame connected therewith, a rear disk-carrying unit having a forwardly extending frame, said units being adapted to be angled relatively to each other, and draft members arranged to rock relatively to each other transversely of the harrow and to pushingly transmit draft force from the front frame to the rear frame, and actuated by lateral swinging of said units to shift the point of application of the draft to the rear frame laterally in a direction opposite to that in which said units swing.

21. A tandem disk harrow comprising a front disk-carrying unit, a rearwardly extending frame connected therewith, a rear disk-carrying unit having a forwardly extending frame, said units being adapted to be angled relatively to each other, and front and rear draft members fixedly mounted respectively on said rear and front frames and actuated by lateral swinging of said units to shift the point of application of the draft to the rear frame laterally in a direction opposite to that in which said units swing.

22. A tandem disk harrow comprising a front disk-carrying unit, a rearwardly extending frame connected therewith, a rear disk-carrying unit having a forwardly extending frame, said units being adapted to be angled relatively to each other, front and rear draft members fixedly mounted respectively on said rear and front frames and actuated by lateral swinging of said units to shift the point of application of the draft to the rear frame laterally in a direction opposite to that in which said units swing, and means for holding said draft members in operative relation to each other.

23. A tandem disk harrow comprising a front disk-carrying unit, a rearwardly extending frame connected therewith, a rear disk-carrying unit having a forwardly extending frame, said units being adapted to be angled relatively to each other, and oppositely curved rocker bearings carried by said frames, respectively, the rocker bearing carried by the front frame being in rear of that carried by the rear frame.

24. A tandem disk harrow comprising a front disk-carrying unit, a rearwardly extending frame connected therewith, a rear disk-carrying unit having a forwardly extending frame, said units being adapted to be angled relatively to each other, and oppositely curved elliptical rocker bearings carried by said frames, respectively, the rocker bearing carried by the front frame being in rear of that carried by the rear frame.

25. A tandem disk harrow comprising a front disk-carrying unit, a rearwardly extending frame connected therewith, a rear disk-carrying unit having a forwardly extending frame, said units being adapted to be angled relatively to each other, oppositely curved rocker bearings carried by said frames, respectively, the rocker bearing carried by the front frame being in rear of that carried by the rear frame, and means for holding said rocker bearings in operative relation to each other.

26. A tandem disk harrow comprising a front disk-carrying unit, a rearwardly extending frame connected therewith, a rear disk-carrying unit having a forwardly extending frame, said units being adapted to be angled relatively to each other, oppositely curved rocker bearings carried by said frames, respectively, the rocker bearing carried by the front frame being in rear of that carried by the rear frame, and crossed links having their forward ends connected with the rear frame and their rear ends connected with the front frame, for holding said rocker bearings in operative relation to each other.

27. In a tandem disk harrow having front and rear disk-carrying units flexibly connected together to permit relative angling thereof, the combination with the rear unit, of means controlled by angling thereof for applying draft force thereto at one side of the median line thereof in opposition to such angling movement and at a distance from such median line proportionate to the degree of angularity of said units.

28. A tandem disk harrow comprising front and rear disk-carrying units, and draft connections flexibly connecting said units together to permit them to be angled relatively to each other, said draft connections being arranged to be actuated by relative angling of said units to shift the point of application of the draft to the rear unit laterally in the same direction as that in which the point of intersection of the transverse axes of said units, projected, moves when said units are angled relatively to each other and proportionately to the degree of such angling movement.

29. A tandem disk harrow comprising front and rear disk-carrying units, and draft connections flexibly connecting said units together to permit them to be angled relatively to each other, said draft connections being arranged to be actuated by relative angling of said units to shift the point of application of the draft to the rear unit laterally in the same direction as the lateral shifting of the center of load incident to such angling.

30. A tandem disk harrow comprising front and rear disk-carrying units, and draft connections flexibly connecting said units together to permit them to be angled relatively to each other, said draft connections being arranged to be actuated by relative angling of said units to apply draft force to the rear unit at one side of the median line of said unit and in opposition to the angling movement thereof.

FREDERICK E. HAND.